July 28, 1970

J. A. ANDERSON 3,521,694

LENGTHWISE-ADJUSTABLE SHADE ROLLER

Filed April 16, 1968

INVENTOR.
JAMES A. ANDERSON
BY
ATTORNEYS

United States Patent Office 3,521,694
Patented July 28, 1970

3,521,694
LENGTHWISE-ADJUSTABLE SHADE ROLLER
James A. Anderson, Muskegon, Mich., assignor to Breneman, Inc., Cincinnati, Ohio, a corporation of Ohio
Filed Apr. 16, 1968, Ser. No. 721,721
Int. Cl. A47h 1/13
U.S. Cl. 160—323        19 Claims

ABSTRACT OF THE DISCLOSURE

A shade roller comprised of tubular parts telescopingly engaged with each other to be longitudinally extendable, in which the innermost such part is a sheet metal tube with a splined surface configuration consisting of a series of alternating raised portions or lands and recessed portions or grooves, each extending longitudinally of the tube.

BACKGROUND

The general desirability of a lengthwise-adjustable shade roller has now been recognized for some time within the industry, and several different approaches have been tried in order to perfect such a roller. Very often, mutually telescoped parts are used, most typically a pair of such parts which are frictionally slidable relative to each other, such that the total length of the roller may be both increased and decreased. Such structures have limitations, however, since their longitudinal strength is less than that of a substantially continuous roller of tubular or other construction, and there also have been difficulties involved in the inadvertent forcible driving of the inner such member completely into the outer member, thereby jamming the structure and greatly decreasing or even destroying its practical value. Also, the mutually telescoped members do not have a continuous single-diameter cylindrical periphery, but instead have a sudden step-like diameter variation at some point along their length, and this soon operates to deform a shade mounted thereon, since as the shade is coiled about the roller during use, it is drawn tightly about the step in the roller surface and this causes a vertical line to soon appear upon the shade which greatly detracts from its appearance.

For such reasons as the foregoing, the inner telescoping member is often made in the form of a short plug which fits into the end of a substantially continuous outer tubular member. This affords a more limited range of adjustment, but it resolves some of the aforementioned other difficulties.

In either event, the trimming of an oversized (i.e., overly long) shade to fit the particular spacing of a given set of mounting brackets is conventionally done by a trimming machine somewhat similar to lathe but much less complicated and precise. In essence, the roller and the shade coiled snugly threabout are fixed in a chuck or like device, and a cutting knife is adjusted to trim the desired amount off the end of the coiled-up shade. In order to completely cut through the coiled shade, it very often occurs that the knife is inadvertently brought into contact with the tubular parts of the shade roller located directly beneath the shade and these tubular parts may thus be completely severed. This is desirable if it results merely in a trimming of the end of the outer shade roller tube flush with the end of the trimmed shade; however it is very undesirable if the part which is severed includes the inner shade roller member which is telescoped into the outer such member since if the inner member is of thin-walled tubular construction the shade-cutting knife may very readily sever this inner tube completely thereby cutting off the mounting means for one end of the shade and roller.

This unfortunate set of circumstances has for the most part prevented the industry from providing an all-metal telescoping tubular shade roller in the past, since there simply was no way to make certain that during the shade trimming operation the inner sheet metal tubular member would not be cut off flush with the end of the shade. Accordingly, adjustable shade rollers have been provided which do utilize a sheet metal tubular outer member, typically mounting the spring motor which rewinds the shade, but such rollers also have parts which are made of wood, usually a solid wood pin end plug, at least if trimming of the shade and shade roller was at all contemplated. In certain other instances, plastic and other pin end plugs have been used in rollers which were partly made of metal, but typically the adjustment of the roller of which they were a part was not accomplished by cutting, but only by extending the roller by pulling its pin plug outward with respect to the main roller body and then indexing the plug at such extended positions.

SUMMARY

The present invention provides a unique lengthwise-adjustable shade roller construction which can be made substantially entirely of sheet metal tubular members, and which in a structural sense may be considered to be all metal. Moreover, the invention provides a shade roller having a pin end member made of tubular sheet metal stock which can remain in place during a shade-trimming operation and which will withstand considerably cutting by the trimming knife without destroying the structural rigidity which it affords to the roller construction, such that inadvertent error in trimming a shade coiled about the roller resulting in contact between the trimming knife and the tubular pin end member will not destroy the latter, even though it is made of thin-walled sheet metal.

Briefly stated, the shade roller construction of the invention includes a first roller member having a mounting means at one end thereof and an open-ended tubular portion at the other end, and a second roller member telescopingly insertable into the open tubular portion of the first roller member, wherein the second roller member comprises a thin-walled sheet metal tube having a longitudinally-splined periphery, i.e., a series of alternating lands and grooves in the surface thereof, said grooved portions of said surface having sufficient structural strength to support the roller construction along its length in the event that some or even all of the aforementioned lands are severed during cut-down of the coiled shade or of the tubular first roller member.

DRAWINGS

FIRST EMBODIMENT

Figure 1:
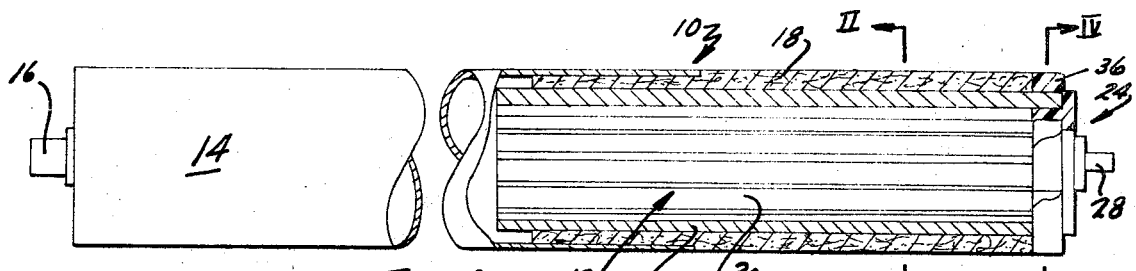
FIG. 1 is a fragmentary sectional elevation of a first embodiment of the present roller, as seen through the plane I—I of FIG. 2.
Figure 2:
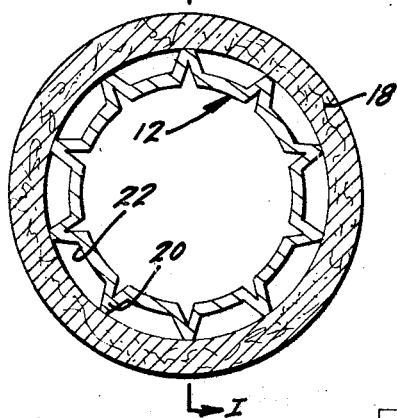
FIG. 2 is an enlarged sectional end elevation taken through the plane II—II of FIG. 1.
Figures 3, 4:
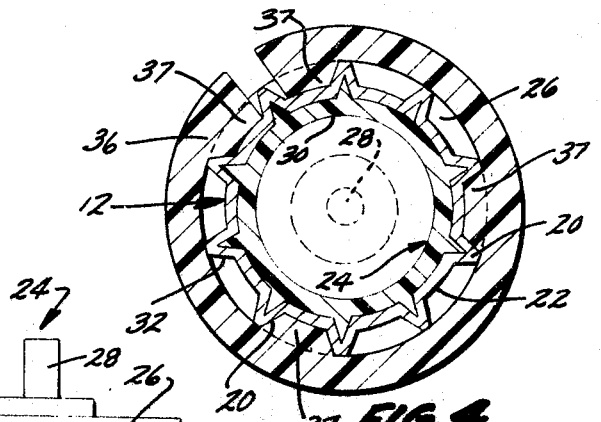
FIG. 3 is an enlarged end elevation of the pin end forming a part of the device of FIG. 1.
FIG. 4 is an enlarged sectional end elevation taken through the plane IV—IV of FIG. 1.

As seen in FIGS. 1, 2, and 4, the first preferred embodiment of the present shade roller construction includes a first roller member 10 and a second roller member 12 telescoped thereinto which protrudes outwardly at least slightly from the end thereof. The first roller member 10 comprises a sheet metal tubular portion 14 which carries a conventional spring-type or other such shade-rewinding motor (not specifically shown) which, in a manner that is now well-known, may be used to drive a flat spade 16 by which the first member 10 is mounted, as in a slotted bracket. Also, the first roller member 10 includes a tubular barrel portion 18 which may be made of fiber or the like and spliced directly onto the sheet metal portion 14 in the manner illustrated, i.e., as by a portion at one end of the fiber tube 18 having a reduced diameter, over which the end extremity of the sheet metal tube 14 will smoothly fit. The sheet metal tube and the fiber tube are preferably fixedly secured together at this splice, as by an adhesive. It should be recognized that other specific structures may also be suitable for the first roller 10. One very acceptable such structure, set forth by way of example, comprises a pair of tubular portions 14 and 18 having similar or directly comparable diameters and wall thicknesses, which are not actually spliced together but instead are joined together by a sleeve which is closely fitted inside both such tubular portions and which extends across their mutually-abutting end extremities.

The second roller member 12 is a tubular member having a wall of a generally uniform thickness and a splined outer periphery consisting of a series of alternating V-shaped raised ridges or lands 20 and depressed or recessed grooves 22, with the tips of the lands 20 extending outwardly and into flush frictional engagement with the interior of the open-ended tubular barrel portion 18 of the first roller member (FIGS. 1 and 2). The outer diameter of the splined second roller member 12, taken around the tips of the lands 20, and the inner diameter of the fiber barrel portion 18 should be such as will provide a firm frictional engagement between these two which while permitting lengthwise sliding movement therebetween under deliberate and intentionally-applied forces, nonetheless resists such movement and also resists relative rotation. The resistance offered to such rotation may be greatly heightened by making the V-shaped lands 20 relatively narrow and making the tips thereof relatively sharp.

The end of the second roller member 12 which remains outward of the first roller member 10 carries a gudgeon pin-bearing end cap 24 (FIGS. 1 and 3), by which this end of the roller construction may be mounted in a bracket or the like. End cap 24 is preferably a one-piece structure of molded plastic or the like, and it comprises a circular disc portion 26 having a concentric gudgeon pin portion 28 extending outwardly therefrom in one direction. It also has a skirt portion 30 which extends outwardly of the disc portion 26 in a direction opposite from that of the gudgeon pin 28. As illustrated, the skirt portion 30 is basically cylindrical in nature, but it has a series of regularly-spaced V-shaped protrusions or ridges 32 extending around it. The overall diameter of skirt portion 30 is such that it will slide inside the splined tubular second roller member 12, with each of the V-shaped ridges 32 on the skirt fitting into one of the spaces created by the formation of the various lands 20 on roller member 12 (note FIG. 4). While not strictly necessary, the end cap 24 is preferably secured in place within the splined second roller member 12, as for example by staking the two together.

As may be seen in FIG. 1, the skirt portion 30 of end cap 24 slides into the splined second roller 12 until the side of the disc-like portion 26 of the end cap comes into abutment with the end of the splined roller member, at which point the roller and end cap 24 are staked or otherwise fastened together, as noted previously. In accordance with the invention, a ring-like stop member 36 (FIGS. 1 and 4) is fitted over the outside of the second roller member 12 to act as a spacer between the end cap 24 and the open end of the tubular barrel portion 18 of the first roller member 10. More specifically, the stop member 36 comprises an annular ring, preferably of plastic, having a split in its wall so that it may be circumferentially expanded for installation upon and removal from the second roller member 12. On its inside surface, stop ring 36 has internally-projecting lug portions 37 (FIG. 4) which fit into certain of the grooves 22 around the outer periphery of the splined second roller 12. The outer diameter of the stop ring 36 is essentially the same as that of the fiber tube 18, whereas the diameter of the disc-shaped part 26 of end cap 24 is approximately the same as, or slightly less than, the inside diameter of the fiber barrel; that is, the end cap disc 26 has approximately the same diameter as that of the splined second roller, taken across a pair of its oppositely-disposed lands 20. Consequently, without the stop ring 36, the entire second roller 14, including its end cap 24, could be slid completely inside the fiber barrel 18. With the stop ring 36 in place, however, the inwardly-projecting lugs 37 of the latter will lie in surface abutment against those portions of the disc-shaped end cap part 26 located between adjacent splines or lands 20, whereas the opposite side of the stop ring will directly abut the end extremity of the fiber barrel 18, thereby preventing insertion of the second roller into the first roller beyond the point illustrated in FIG. 1. This is particularly desirable for shipping and the like, since it will prevent the second roller from being jammed totally within the first roller. The stop ring 36 is not strictly necessary for proper shade-roller functioning of the present construction, however, and in operation the stop ring may, if desired, be removed and discarded when the roller is mounted, at which time the roller asembly may be longitudinally adjusted by sliding the splined second roller 12 longitudinally within the fiber barrel 18 of the first roller member, either inwardly or outwardly thereof.

SECOND EMBODIMENT

Figure 5:
FIG. 5 is a fragmentary sectional side elevation of a second embodiment of the invention.
Figure 6:
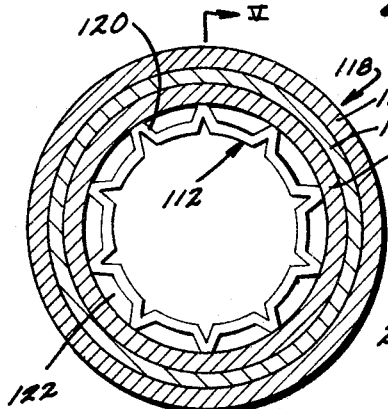
FIG. 6 is an enlarged sectional end elevation of the structure of FIG. 5, taken through the plane VI—VI thereof.
Figure 7:
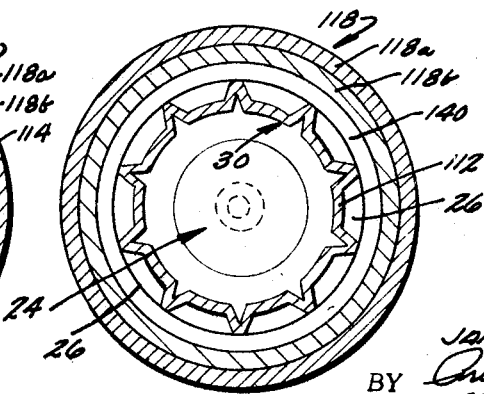
FIG. 7 is an enlarged sectional end elevation of the structure of FIG. 5, taken through the plane VII—VII thereof.

A second embodiment of the present shade roller construction is illustrated in FIGS. 5, 6, and 7. To a considerable extent, this second embodiment resembles the first, already described. That is, it also includes a first roller, designated 110, having a tubular portion 114, with a second roller member 112 which is telescopingly insertable within the first roller member. The second roller member 112 of this embodiment is substantially identical to the second roller member 12 of the previous embodiment, comprising a longitudinally splined sheet metal tube having the same type of V-shaped lands 120 and grooves 122 alternately disposed about its outer periphery. Also, the second roller member 112 has an end cap member 24 of the same type described previously, attached thereinto in the same way noted above. Similarly, a stop ring 36 of the same type noted previously is provided, which fits over the second roller 112 in the same manner noted previously in connection with the first embodiment, already described.

The major departure of the second embodiment from the first is that the first roller member 110, including the tubular portion 114 thereof, is a continuous metal tube, into which the splined second roller 112 directly fits with a snug frictional engagement. That is, there is no direct counterpart of the fiber barrel portion 18 of the first roller member of the previous embodiment; instead, the sheet metal tube 114 of the second embodiment carries an outer tube 118 which is preferably formed of at least two wraps of flat fiber-like material such as paper or the like. These wraps of paper are preferably adhesively secured together to form a continuous tube of substantially constant diameter, and they are also preferably adhesively secured to the outside of the sheet metal tubular portion 114 of the first roller, so as to extend from the end thereof carrying the mounting spade 16 onward beyond the opposite end of this sheet metal portion and to the opposite end extremity of the second roller portion 112.

Thus, the overlying tubular portion 118 extends unsupported over all of that portion of the splined second roller 112 which extends outwardly from the end of the tubular sheet metal member 114, with a space 140 (FIG. 7) existing between the outer tube 118 and the splined tube 112 at all such points. It has been found that an outer tube 118 made from plies or layers of paper in the manner noted above is sufficiently strong to resist collapse over such unsupported extremities, and such a tube will therefore maintain its continuous diameter over the entire extent of the shade roller construction. Accordingly, while a relatively stiff single-layer tube of fiber such as is illustrated at 18 in FIG. 1 might be used in place of the multilayered outer tube 118, the latter is preferred for reasons of economy and manufacturing facility, particularly since it may be formed by spirally winding layers of paper.

It should be noted that, while it is generally satisfactory to have the outer tube 118 cantilevered or unsupported over that portion thereof extending outwardly over the splined second roller member 112, additional support for tube 118 in this region may be obtained by using the end cap 24 to its fullest advantage. That is, the diameter of the disc-like portion 26 of the end cap may be made to approximately equal the inner diameter of outer tube 118, as illustrated in FIG. 5. In this form, removal of the annular spacer ring 36 will allow the splined second roller member 112 to be telescoped inwardly of the first roller until the disc portion 26 of end cap 24 slides inside outer tube 118, to internally support the end extremity thereof and add considerable strength to the portion of the outer tube which is separated by space 140 from the splined roller member 114. Alternatively, the disc portion 26 of end cap 24 may be made in a somewhat conical form, so that it will wedge into the end of outer tube 118 and in this manner support the same.

OPERATION

In accordance with the present invention, a shade roller construction conforming in substance to either of the preferred embodiments disclosed above has a unique feature made evident in the cut-down or trimming operation for shades which are wider than the window opening into which they are to be mounted. That is, a conventional shade-trimming knife may be used and the roller construction of either embodiment may simply be placed in the typical chuck of such trimming machine, with the gudgeon pin-bearing end cap 24 and the splined sheet metal second roller member 12 (or 112) left in place within the first roller member, to support the latter from the opposite end. As the shade-cutting knife is forced against the coiled or rolled-up shade material to trim the latter at the desired point near the end cap 24, the second roller member acts as a back-up device or mandrel against the force with which the cutting knife is applied.

It is very difficult to stop the cutting operation precisely at the point where it has severed all of the shade material and the outer roller portions but has not contacted the inner shade roller portions located immediately therebeneath, and for this purpose the present roller construction is particularly useful. That is, it is not particularly harmful to the structural integrity of the roller construction to have the cutting knife come into direct contact with and actually sever the outer portions of the V-shaped lands 20 (or 120), since the recessed grooves 22 (or 122) located therebetween actually comprise the major part of the circumference of the second roller, the lands comprising the minor part. Thus, even if the lands were to be completely cut through, the second roller member would nonetheless continue to support its end of the roller construction with very adequate stability.

Typically, however, such drastic cutting of the second roller will not occur, since it is relatively easy for even an inexperienced operator to detect the point where the cutting knife has made initial contact with the outer tips of the V-shaped lands, since a very noticeable bumping effect occurs when this happens. This warns the operator that he should immediately withdraw the cutting knife and stop the cutting operation at this point. This is in sharp contrast to the situation which would occur if the second roller member were merely a sheet metal tube, particularly of the relatively thin wall thicknesses (on the order of 0.010 inch) ordinarily used in shade roller construction, such as is used herein in the first roller members 114. In such an instance of a plain tubular second roller member, it is practically impossible to avoid plunging the shade-cutting knife completely through the second roller member, thereby cutting the end of it completely off.

Accordingly, the present invention makes possible the use of conventional shade-trimming equipment in connection with a shade roller which is essentially of all-metal construction. Furthermore, due to the continuous or constant-diameter outer periphery of each of the embodiments of the shade roller assembly provided herein, the shade wound upon the outside of the roller will always operate in a satisfactory manner during the rolling and unrolling thereof, and will never suffer deformation as a result of the telescoped internal structure of the roller which lends to the roller the valuable quality of adjustability. That is, regardless of how much of the shade must be trimmed from it, once the trimming operation is completed, the second roller member may merely be pushed into the first roller member an additional distance equalling the width of the shade which has been cut off, whereupon the gudgeon pin 28 will be precisely positioned for the intended mounting brackets.

Finally, it should be noted that in the trimming or cut-down of a shade mounted upon the roller presently disclosed, the invention contemplates that a simple but unique gauge element may be found highly useful. Such a gauge could, for example, have an elongated U-shaped form, with a pair of spaced, generally parallel legs whose overall width is such that it may be slid inside the second roller members 18 or 118. Such a gauge could thus be used to insert the second roller a desired distance inside the first roller member for the cut-down operation. The legs of the gauge would carry length-measuring indicia, so that they could be used to measure the extent to which the second roller members had been inserted into the first roller members as by placing the ends of such legs on the end of the end cap 24 and reading the gauge against the tubular outer end of the first roller members. Also, the gauge itself could be used to push the second roller into the first roller and, if desired, a hooking or other such configuration could be provided between the ends of the gauge legs and the end cap or other portion of the second roller members, so that the gauge could be used to pull the second roller member outward with respect to the first roller member. Additionally, the aforementioned length-measurement indicia on the gauge could be calibrated in terms of the position of the inner end of the second roller member rather than the outer end thereof which carries end cap 24, so that the inner end could be positioned precisely at a desired point with respect to the outer roller and the cut-down blade in preparation for the cut-down operation. This is a desirable feature, since it may be assumed that in most instances the trimming blade will indeed cut into the second roller member at least slightly, and by positioning the inner end of this roller member in a desired location, the place where such damage to the second roller will occur may be precisely located at a predetermined position along the length of the second roller, as for example nearest the inner end extremity thereof, where such cutting will do the least possible damage to the structural integrity of the roller construction.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are defined as follows:

1. A shade roller construction particularly adapted for being shortened in length by severing a portion therefrom, comprising in combination: a first roller member having a mounting means at one of its ends and an open-ended tubular portion at its other end; a second roller member telescopingly insertable into said open tubular portion of said first roller member; said second roller member having mounting means at its outward end, opposite the inserted end thereof; said second roller member comprising a thin-walled, hollow tubular structure with a longitudinally splined wall portion defining alternating lands and grooves in the outer surface thereof, the major part of the circumference of said tubular structure being defined by said grooves and the minor part by said lands, said lands contacting and non-rotatably engaging the interior of said first roller member when said second member is telescopically inserted thereinto, said groove portions of said second roller member having sufficient structural strength to support said roller construction along its length in the event said land portions are severed at least in part during cut-down of said first roller portion.

2. The shade roller construction of claim 1, wherein the tubular wall of said second roller member is of a generally uniform thickness and said lands are V-shaped.

3. The shade roller construction of claim 1, wherein said second roller member tubular structure is of relatively thin sheet metal construction.

4. The shade roller construction of claim 1, wherein said second roller member is frictionally seated within said tubular portion of said first roller member.

5. The shade roller construction of claim 4, wherein said tubular portion of said first roller member comprises a tube of fiber-like material.

6. The shade roller construction of claim 5, wherein said first roller member comprises a metal tube having said fiber-like tube forming said open-ended tubular portion secured thereto as an axial extension, said second roller member being frictionally seated within said fiber-like tube.

7. The shade roller construction of claim 6, further including a ring-like stop element mountable about said splined second roller member at the said outward end thereof, said stop element having an outer diameter sufficiently large to engage the open tubular end of said first roller member to limit telescoping insertion thereinto of said second roller member.

8. The shade roller construction of claim 1, wherein said first roller member comprises an elongated tube of substantially constant diameter, wherein said splined second roller member is frictionally seated within said first roller tube and extends outwardly thereof, and including an outer tube element telescoped over both said first and second roller members and being longitudinally coextensive with both of the same; said outer tube comprising an attachment mount for a window shade to be carried by said roller.

9. The shade roller construction of claim 8, wherein said outer tube element is of fiber-like material.

10. The shade roller construction of claim 9, wherein said outer tube element comprises a plurality of wraps of sheet material.

11. The shade roller construction of claim 10, wherein at least some of said wraps are adhesively secured together.

12. The shade roller construction of claim 8, wherein said second roller member tubular structure is of relatively thin sheet metal construction.

13. The shade roller construction of claim 12, wherein said first roller member comprises a sheet metal tube.

14. The shade roller construction of claim 8, wherein said outer tube element is secured to said first roller member, said second roller member being slidable inside both said first roller member and said outer tube element.

15. The shade roller construction of claim 14, further including a stop means coacting between said splined second roller member and the proximate end of said outer tube to limit telescopic insertion of said second roller member into said first roller member.

16. The shade roller construction of claim 15, wherein said stop means comprises a ring-like element seated about said splined second roller member.

17. The shade roller construction of claim 15, wherein said second roller member comprises a sheet metal tube, and wherein said outer tube element is of fiber-like material.

18. The shade roller construction of claim 17, wherein said outer tube element comprises a plurality of wraps of sheet material.

19. The shade roller construction of claim 18, wherein at least some of said wraps are adhesively secured together.

References Cited

UNITED STATES PATENTS

| | | | |
|---|---|---|---|
| 3,203,468 | 8/1965 | Gossling et al. | 160—323 |
| 3,308,874 | 3/1967 | Anderson | 160—326 |
| 3,315,728 | 4/1967 | Anderson et al. | 160—326 |
| 3,362,461 | 1/1968 | Stark | 160—323 |

PETER M. CAUN, Primary Examiner